US008830299B2

(12) United States Patent
Osipov et al.

(10) Patent No.: US 8,830,299 B2
(45) Date of Patent: Sep. 9, 2014

(54) METHOD AND DEVICE FOR DETERMINING THE SPEED OF TRAVEL AND COORDINATES OF VEHICLES AND SUBSEQUENTLY IDENTIFYING SAME AND AUTOMATICALLY RECORDING ROAD TRAFFIC OFFENCES

(75) Inventors: Sergey Konstantinovich Osipov, Nizhny Novgorod (RU); Aleksey Yurievich Malinkin, Nizhegorodskaya oblast' (RU)

(73) Assignee: OOO "Korporazija Stroy Invest Proekt M", Moscow (RU)

( * ) Notice: Subject to any disclaimer, the term of this patent is extended or adjusted under 35 U.S.C. 154(b) by 20 days.

(21) Appl. No.: 13/569,506

(22) Filed: Aug. 8, 2012

(65) Prior Publication Data

US 2013/0038681 A1 Feb. 14, 2013

Related U.S. Application Data

(63) Continuation of application No. PCT/RU2010/000048, filed on Feb. 8, 2010.

(51) Int. Cl.
*H04N 7/00* (2011.01)
*G08G 1/017* (2006.01)
*G08G 1/054* (2006.01)

(52) U.S. Cl.
CPC .............. *G08G 1/0175* (2013.01); *G08G 1/054* (2013.01)
USPC .................. 348/36; 348/37; 348/38; 348/39; 359/725; 396/436

(58) Field of Classification Search
CPC . G08G 1/0175; G08G 1/054; H04N 5/23238; H04N 5/2628; H04N 5/2259; G06T 3/4038; G02B 13/06
USPC ........................................................... 348/36
See application file for complete search history.

(56) References Cited

U.S. PATENT DOCUMENTS 5,515,042 A * 5/1996 Nelson .......................... 340/937
5,572,428 A * 11/1996 Ishida et al. ................. 701/301

(Continued)

FOREIGN PATENT DOCUMENTS

CN 1707545 A 12/2005
CN 101246648 A 8/2008

(Continued)

OTHER PUBLICATIONS

International Search Report from corresponding International Application PCT/RU2010/000048 filed on Feb. 8, 2010, mailed on Oct. 28, 2010.

*Primary Examiner* — Andy Rao
*Assistant Examiner* — Shan Elahi
(74) *Attorney, Agent, or Firm* — Patentbar International, P.C.

(57) ABSTRACT

The automatic system makes it possible to reduce the probability of error when identifying the vehicle of an offender, increases the length of a speed limit monitoring zone to several hundreds/thousands of meters, and makes it possible to cut expenditure on the construction and maintenance of gantries for the installation of speed limit monitoring devices. A method for the combined processing of signals from a radar and a panoramic video camera is proposed, in which data flows from the video camera and the radar are independently obtained, after which they are compared and data about the speed and coordinates are obtained with little probability of error in identifying the vehicle of an offender. The device for realizing the method comprises a radar with a signal processing module to calculate the speed and distance of all vehicles on a chosen section of road, and a panoramic video camera.

5 Claims, 6 Drawing Sheets

(56) References Cited

U.S. PATENT DOCUMENTS

| | | | | |
|---|---|---|---|---|
| 5,734,337 | A * | 3/1998 | Kupersmit | 340/937 |
| 5,809,161 | A * | 9/1998 | Auty et al. | 382/104 |
| 6,266,627 | B1 | 7/2001 | Gatsonides | |
| 6,696,978 | B2 * | 2/2004 | Trajkovic et al. | 340/936 |
| 7,701,363 | B1 * | 4/2010 | Zlojutro | 340/988 |
| 8,238,610 | B2 * | 8/2012 | Shah et al. | 382/104 |
| 2002/0047901 | A1 * | 4/2002 | Nobori et al. | 348/149 |
| 2002/0198632 | A1 * | 12/2002 | Breed et al. | 701/1 |
| 2004/0054513 | A1 * | 3/2004 | Laird et al. | 703/8 |
| 2004/0101166 | A1 * | 5/2004 | Williams et al. | 382/104 |
| 2004/0184638 | A1 * | 9/2004 | Nobori et al. | 382/104 |
| 2004/0252193 | A1 * | 12/2004 | Higgins | 348/149 |
| 2006/0017807 | A1 * | 1/2006 | Lee et al. | 348/36 |
| 2006/0038895 | A1 * | 2/2006 | Suzuki et al. | 348/222.1 |
| 2006/0203092 | A1 * | 9/2006 | Nobori et al. | 348/148 |
| 2008/0166023 | A1 * | 7/2008 | Wang | 382/107 |
| 2008/0266140 | A1 * | 10/2008 | Gebert | 340/936 |
| 2008/0278365 | A1 * | 11/2008 | Klein et al. | 342/104 |
| 2009/0046897 | A1 * | 2/2009 | Rowsell et al. | 382/107 |
| 2009/0102699 | A1 * | 4/2009 | Behrens et al. | 342/109 |
| 2009/0128630 | A1 * | 5/2009 | Kanaoka et al. | 348/148 |
| 2009/0207046 | A1 * | 8/2009 | Arrighetti | 340/937 |
| 2009/0231161 | A1 * | 9/2009 | Malarky | 340/933 |
| 2010/0231720 | A1 * | 9/2010 | Tucker et al. | 348/149 |
| 2010/0286897 | A1 * | 11/2010 | Dedic et al. | 701/117 |
| 2011/0043381 | A1 * | 2/2011 | Sirota et al. | 340/937 |
| 2012/0069182 | A1 * | 3/2012 | Sumi et al. | 348/148 |

FOREIGN PATENT DOCUMENTS

| | | | |
|---|---|---|---|
| EP | 1513125 | A2 | 3/2005 |
| EP | 1744292 | A2 | 1/2007 |
| GB | 1211834 | A | 2/1968 |
| RU | 68741 | U1 | 11/2007 |
| RU | 83644 | U2 | 6/2009 |
| RU | 2382416 | C2 | 2/2010 |
| WO | 9946613 | A1 | 9/1999 |
| WO | 2005062275 | A1 | 7/2005 |

* cited by examiner

METHOD AND DEVICE FOR DETERMINING THE SPEED OF TRAVEL AND COORDINATES OF VEHICLES AND SUBSEQUENTLY IDENTIFYING SAME AND AUTOMATICALLY RECORDING ROAD TRAFFIC OFFENCES

RELATED APPLICATIONS

This Application is a Continuation application of International Application PCT/RU2010/000048 filed on Feb. 8, 2010, which is incorporated herein by reference in its entirety.

FIELD OF THE INVENTION

The invention relates to traffic control systems and more specifically to methods and devices for monitoring compliance with road traffic rules, including speed.

BACKGROUND OF THE INVENTION

To control compliance of vehicles moving in a stream with a speed limit and automatically record violations, it is necessary to measure the speed and coordinates of a vehicle and, in the case of a speed limit violation, identify it with a required, rather high probability. Speed is generally measured by radars, whose principle of speed measurement is based on the Doppler effect, or by laser devices (lidars), whose principle of speed measurement is based on an assessment of the time intervals between emitted and received (as reflected from the vehicle) pulses, followed by speed calculation. These devices provide reliable metrological data on vehicle speeds. In speed monitoring, the vehicle coordinates are not determined but as a rule are set, i.e. a radar or a lidar measures the vehicle speed in a predetermined zone of control, whose size is comparable to that of a vehicle. In most reported cases, the vehicle is identified by its state registration (license) plate, which is read out by a video camera in the same zone of control and recognized by special software installed in the monitoring unit (for example, see the application WO9946613 $IPC^6$, G01S 13/00, G08G 1/052, 1/054 issued on Sep. 6, 1999; CN1707545 $IPC^7$ G08G 1/052, 1/054 issued on Dec. 14, 2005).

There are known methods and devices for determining the speed and coordinates using video cameras and sensor systems embedded in the roadway, where cameras are used to record the speed-violating vehicle (see, e.g., patent EP1513125 $IPC^7$ G08G 1/017, 1/04, 1/054 issued on Mar. 9, 2005 and international application WO2005/062275 $IPC^7$ G08G 1/01, 1/052, 1/054 issued on Jul. 7, 2005).

The drawbacks of these speed compliance monitoring systems are the specific requirements for the climatic conditions of their use (no snow and sub-zero temperatures). The above systems can record speed violations only at a road section situated between the sensors. Moreover, it is recommended to narrow the road section close to the distance between vehicle axes in order to measure the speed of a speed-violating vehicle more accurately.

There exists a speed measurement method where a selected road section is continuously recorded by a panoramic video camera (for example, see EP 1744 292 $IPC^7$ G08G 1/04, 1/052, 1/054, G06 T7/00 issued on Jul. 10, 2006). The speed calculation is based on the distance between two fixed positions of the vehicle in two frames recorded by this video camera and on the time interval between these frames. The video camera is calibrated against four vertexes of a rectangle which are actually marked on the road surface at known distances. The detected speed violator is recorded by another camera capable of providing a higher definition video frame. The main disadvantage of this method and a device for its implementation according to the given patent is that, according to theoretical estimates and GOST R 50856-96 standard, the video camera is not the instrument intended to provide reliable metrological vehicle speed data, because it provides the vehicle speed calculation with an error depending on the video camera adjustment and calibration accuracy and on the dimensions of a moving vehicle.

One more method to detect speed-violating vehicles moving at exceeded speeds is known (see U.S. Pat. No. 6,696,978 $IPC^7$ G08G 1/01, 1/052, 1/054, issued on Feb. 24, 2004). In accordance with this method, electromagnetic pulses are emitted by a radar or a laser locator (lidar) in the direction of the selected vehicle. Then reflected pulses are received, the vehicle speed is determined by a known method, and, if a speed limit is violated, a signal is generated to activate a video camera in order to capture a frame containing the license plate together with the measured speed value. The frame shall contain the following data: the measured speed value, the recognized license plate and other data required for vehicle identification. The received data are transmitted to the operational traffic control center for taking the appropriate measures against offences committed. The drawback of the method is that only one vehicle should be in the radar's coverage area. It means that the number of radars and video cameras should correspond to the number of traffic lanes, which significantly increases equipment and operation costs. Moreover the probability that the radar can simultaneously receive signals reflected from several vehicles is rather high. This increases the likelihood of the error of identifying a speed-violating vehicle which is not acceptable in cases where vehicles move in heavy traffic along several lanes. For instance, in accordance with patent GB 1211834 (IPC G01S 13/92, G08G 1/052, G08G 1/054, vehicle recording (photographing) is prohibited if there is more than one vehicle in the radar coverage area.

A method for determining the vehicle speed and coordinates together with the subsequent vehicle identification and automatic recording of traffic violations described in U.S. Pat. No. 6,266,627, $IPC^7$, G08G 1/00, 1/052, 1/054, G01S 13/00 issued on Jul. 24, 2001 is quite similar to the proposed one in terms of its technical essence. In line with this method, electromagnetic pulses are emitted in the direction of vehicles moving along a road section, the reflected pulses are received, the distance and speed of the vehicle are calculated through comparison of the parameters of emitted and received pulses, and then the measured vehicle speed is compared with the maximum speed allowed in the given road section. If the speed limit is exceeded, a signal is generated to capture the license plate of a violating vehicle by a video camera; it is followed by the vehicle identification and automatic recording of speed limit violations. The traffic lane of the speed-violating vehicle is determined from the calculated distance.

The method also has the same drawback as the previous one does i.e. a high probability of the erroneous identification of a speed-violating vehicle. This can be explained as follows. For clarification, let's consider the real situation indicated in FIG. 1 and described in this patent. As is shown in FIG. 1, the radar beam is diverged at the angle of 4-5°. In fact, this is idealization used in theoretical calculations and corresponding to the −3 dB radiated power in the radar's main lobe. The real antenna radiation pattern, with regard to the main lobe power at −3 dB to approximately −20 dB level, is much wider and always contains side lobes as is shown in FIG. 1 of the additional materials pertaining to the prototype patent and is marked with hatching and pink color. There are signals reflected from vehicles in the aperture area of the antenna pattern (both in the main and side lobes) (see FIG. 1). All the vehicles, which fell within the arc with the radius R (a hatched green sector in FIG. 1), are at the same distance from the radar and hence all the pulses reflected from these vehicles will arrive at the radar simultaneously. As can be seen from FIG. 1, at least three vehicles moving along different traffic lanes are at the same distance from the radar and their returns will arrive at the same time but with different power. The power of received signals Pr is calculated by the formula:

$$P_r = \frac{P_t \cdot G_a^2 \cdot S_o}{4 \cdot \pi^3 \cdot R^4}$$

where Pr is the power of received signals, Pt is the power of emitted signals, $Ga^2$ is the squared antenna gain, So is the effective target area, $R^4$ is the biquadrate of the target distance from the radar, which is the function of several varying parameters. Thus, the power of received signals Pr reflected from a vehicle with a small So (a small vehicle) at high Pt (the main lobe) can be commensurable with the power Pr of received signals reflected from a vehicle having large So (a big vehicle) but at low Pt (side lobes) which is moving along another traffic lane and is not exceeding the speed limit This may result in the false identification of a speed-violating vehicle.

SUMMARY OF THE INVENTION

As an example, we refer to a reliable and authoritative source ("Radar Reference Book" edited by M. Skolnik., Vol. 1, Chapter 9, p. 356): "... any numerical value of the effective target area (So in the above-mentioned formula) is correct only for specific targets, combination of polarizations, spatial location and frequency, which this value has been determined for. In most applicable cases, the effective target area may vary over a wide range of 20-30 dB or more at a relatively small change in any of these parameters. "

It is thus obvious that the radar may receive reflected signals both from a vehicle moving along the monitored lane and seen clearly by the video camera and from a vehicle moving along the adjacent traffic lane. Assuming that the distances are comparable, the area of a vehicle moving parallel to the monitored one is several times larger, while its speed exceeds the allowed speed limit, then we are in a situation where a monitoring device will send a signal that the vehicle moving within the monitored area has exceeded the speed limit If the probability of such events is high (heavy traffic flow), the number of erroneously recorded speed violations will be significant, which will substantially reduce the service characteristics of the prototype method.

The above analysis suggests that the prototype method has a grave disadvantage, namely, a high probability of the erroneous speed-violator identification. This makes the prototype method unsuitable for use on a multi-lane road with a heavy traffic flow.

Technically, the closest prototype to the proposed device is a device for determining the speed and coordinates of vehicles with their subsequent identification and automatic recording of traffic violations, which is described in U.S. Pat. No. 6,266,627 ($IPC^7$ G08G 1/00, 1/052, 1/054, G01S 13/00 issued on Jul. 24, 2001). The device consists of a radar, a video camera to record and identify the license plate and a data control and processing module. The data control and processing module is connected both with the radar and the video camera and contains a special device connected with the above video camera for generating a signal (a mark) when a speed limit violation is detected.

As with the previous prototypes, the disadvantage of this device, which implements the above method, is a high probability of erroneously identifying a speed-violating vehicle. This makes it impossible to use the device on multi-lane roads or in case of heavy traffic. In addition, the prototype device suffers from the small length of the speed monitoring area—not more than 20 to 30 meters.

The proposed device is intended to meet the following objectives:

- to develop a method for determining the speed and coordinates of vehicles and a device for its implementation, which will decrease the probability of the false identification of a speed-violating vehicle in the automatic speed violation recording systems;
- to extend the speed monitoring area from one or two dozens of meters to several hundreds and thousands of meters;
- to use one rather than several devices to monitor multi-lane road sections.

This will drastically reduce the costs to build and service elevated structures used for the installation of speed monitoring devices.

As to the proposed method, the above objectives are achieved, as in the prototype method, by emitting electromagnetic pulses in the direction of vehicles moving along a monitored road section and receiving the reflected pulses. The distance and the speed of at least one vehicle are calculated by comparing the parameters of emitted and received pulses. Then the measured vehicle speed is compared with the maximum allowed speed at the given road section. If the speed limit is violated, a signal is generated to recognize the license plate of the speed-violating vehicle using a video camera; it is followed by vehicle identification and automatic recording of traffic violations.

A novel feature of the developed method is that the mentioned pulses are emitted by a radar simultaneously with capturing the same road section by a panoramic video camera. The video camera is calibrated so that the real coordinates of distances from the video camera to the corresponding sections on the road are assigned to each row element $Y_i$ and each column element $X_i$ of the video camera matrix. Moreover, based on the pulses received by the radar, the distance and speed are calculated not for one but for all the vehicles, which are at the moment on the selected road section hundreds of meters long; using the image of vehicles captured by the video camera, the coordinates and speeds of the same vehicles, which are in the a frame, are calculated independently and simultaneously. Then, data streams containing the speed and coordinate values for all the vehicles, which are at the moment on the selected road section, and received by the radar and the video camera independently of each other are compared. To get the reliable metrological speed and coordinate values, the radar data are used. Each vehicle violating traffic rules is tracked until the license plate is recognized. Then the image frame of the speed-violating vehicle is generated; the easily readable license plate, date, time and recorded speed and/or coordinate values are displayed in this frame, which allows automatic recording of traffic violations.

In the first particular embodiment of the developed method, it is advisable to compare the above data streams containing the speed and coordinate values of all the vehicles being at the moment on a selected roadway section and obtained by the radar and the video camera independently of each other using, for example, the correlation method.

As regards the device, the set objectives are achieved through the fact that the developed device, as the prototype device, contains a radar, a video camera to record and recognize the license plate of vehicles violating the speed limit, and a control and data processing module connected with them.

A novel feature of the developed device is that the radar has a signal processing module, which calculates the speeds and distances of all the vehicles moving along the selected road section. The device includes a panoramic video camera capturing a road section 40-50 meters to hundreds of meters long, which is connected to a control and data processing unit. The data processing unit is equipped with software to synchronize the radar and panoramic video camera, compare the data streams obtained from the radar and video camera, provide the reliable metrological measurements of the violating vehicles' speed and coordinates and transmit the data for automatic recording of traffic violations.

BRIEF DESCRIPTION OF THE DRAWINGS

In the first particular embodiment of the device, it is advisable that the functions of a panoramic view camera and a camera used to recognize the license plate are performed by a single wide-angle megapixel video camera.

In the second particular embodiment of the device, it is preferred to use several "standard" cameras to record and recognize the license plate, depending on the number of traffic lanes.

Figure 1:
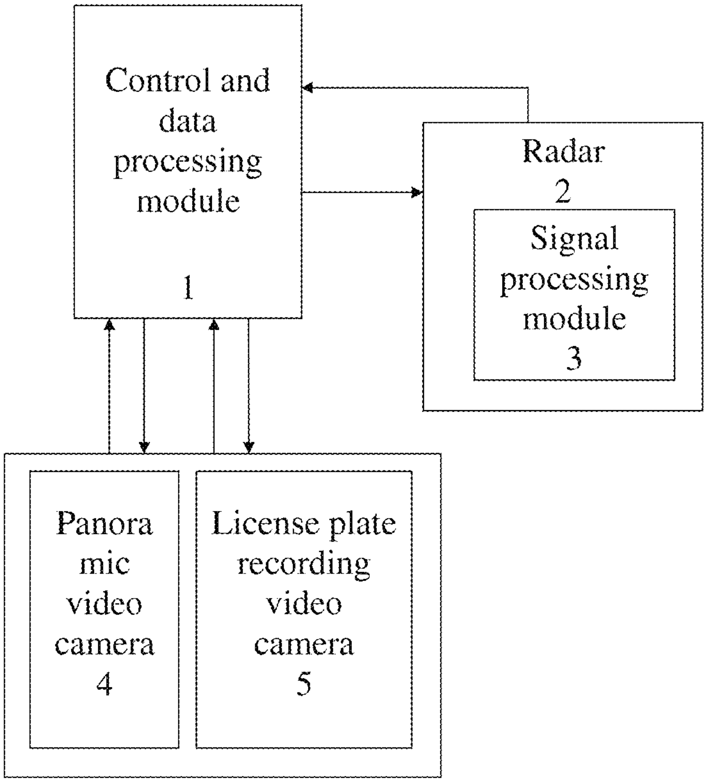
FIG. 1 is a block diagram of the developed device according to claim 3.
Figure 2:
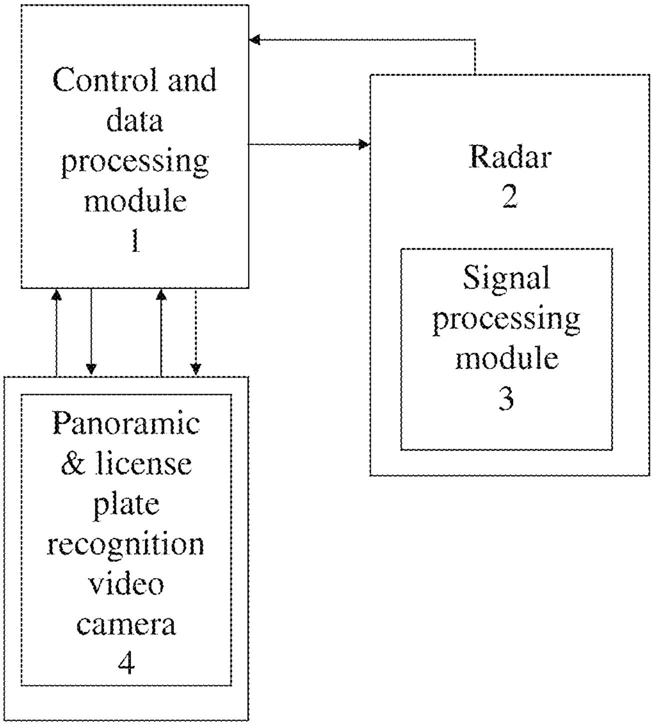
FIG. 2 is a block diagram of the developed device according to claim 4.
Figure 3:
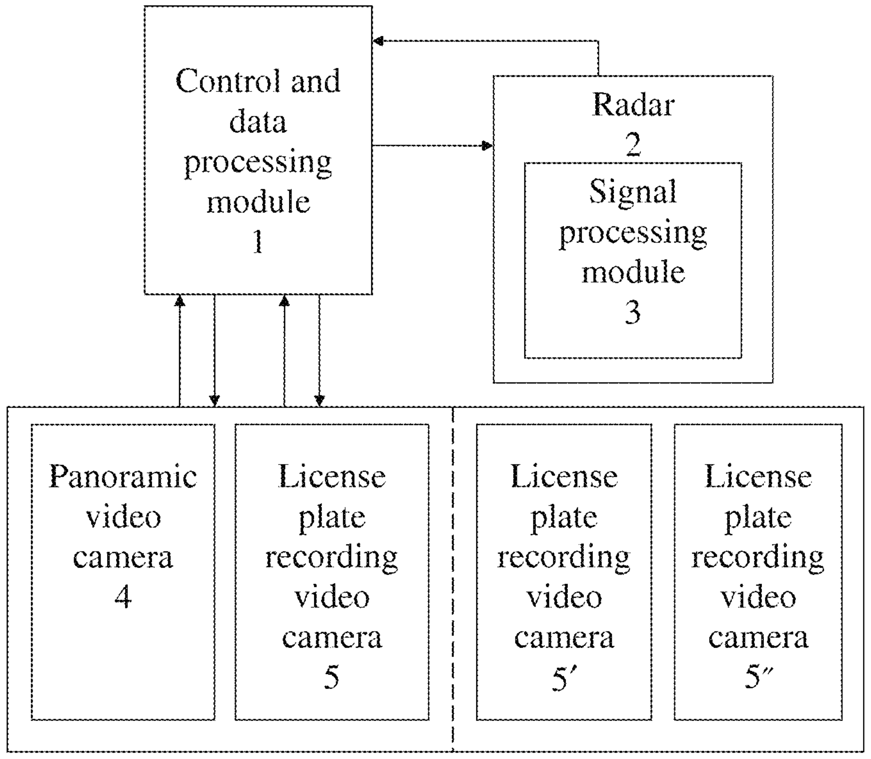
FIG. 3 a block diagram of the developed device according to claim 5 using several cameras to detect the license plate in accordance with the number of lanes.

The device shown in FIG. 1 contains control and data processing module 1, radar 2 with radar signal processing unit 3, panoramic video camera 4 and license plate recognition camera 5.

DETAILED DESCRIPTION OF THE PREFERRED EMBODIMENTS

Control and data processing module 1 is a computer with software which:

- controls radar 2 and video cameras 4, 5;
- receives signals from video cameras 4, 5;
- receives data from signal processing module 3 (signals from radar 2);
- generates data streams related to the coordinates and speeds of the vehicles which are in the frame captured by video camera 4;
- compares the data streams from module 3 of radar 2 and from video camera 4;
- transmits data to the central traffic control station (not shown) for the automatic recording of traffic violations.

Figure 5:
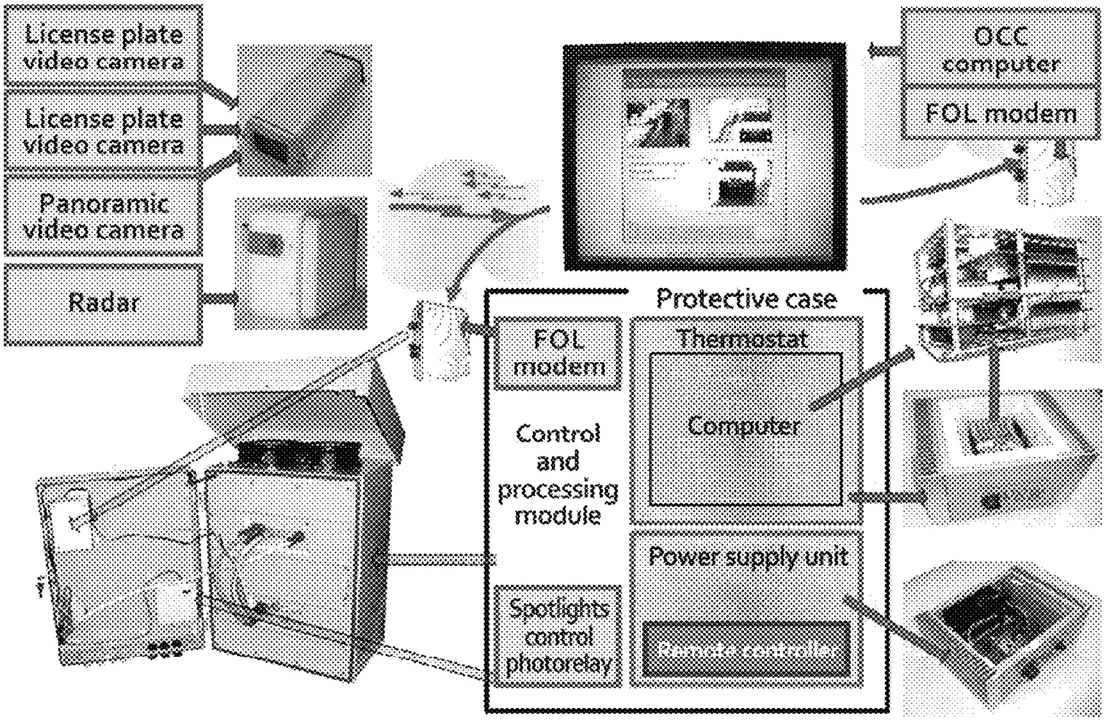
FIG. 5 shows the appearance and configuration of the components and units which are part of the developed device.

The specific embodiment of control and data processing module 1 is based on the Intel Pentium M processor. Module 1 features high performance, comparatively low power consumption (~40 W), is structurally protected against mechanical impacts by a special damping system and is intended to operate at −40 to +60° C. (see FIG. 5).

A classic monopulse radar providing digital storage and processing of the received pulses is used as radar 2. The carrier frequency is 24.15 GHz. The half-amplitude pulse width is 30 ns. The pulse repetition interval is 25 microseconds. Control and signal processing module 3 includes a processor which can simultaneously select, generate and store bursts of 256÷1024 pulses for each distance element, perform fast Fourier transformation with these pulse bursts and detect signals reflected from vehicles. Module 3 can also provide vehicle discrimination by speed starting with the zero values.

In one particular case, a wide-angle megapixel video camera is used as panoramic video camera 4, which simultaneously acts as license plate recognition camera 5 because it offers a high definition capability, due to the use of 5-10 times more matrix elements compared with a "standard" video camera. This embodiment variant is advisable for multi-lane roads sections (for roads with more than two lanes).

In another particular case, one wide-angle panoramic video camera 4 and several license plate recognition video cameras 5 are used to perform the function of panoramic video camera 4. The number of the license plate recognition video cameras shall correspond to the number of traffic lanes. This solution is preferable for roads with a small number of lanes because "standard" video cameras are much cheaper than the megapixel ones.

The developed method of determining the speed and coordinates of vehicles with their subsequent identification and automatic recording of traffic violations in accordance with claim 1 is implemented by a device shown in FIG. 1 in the following way.

Before starting the device, its preliminary calibration is done: the coordinates of distances from panoramic video camera 4 to the corresponding sections of the road are assigned to each row element $Y_i$ and each column element $X_i$ of the above video camera matrix. This is required for an independent vehicle speed assessment using video camera 4.

Figure 4:
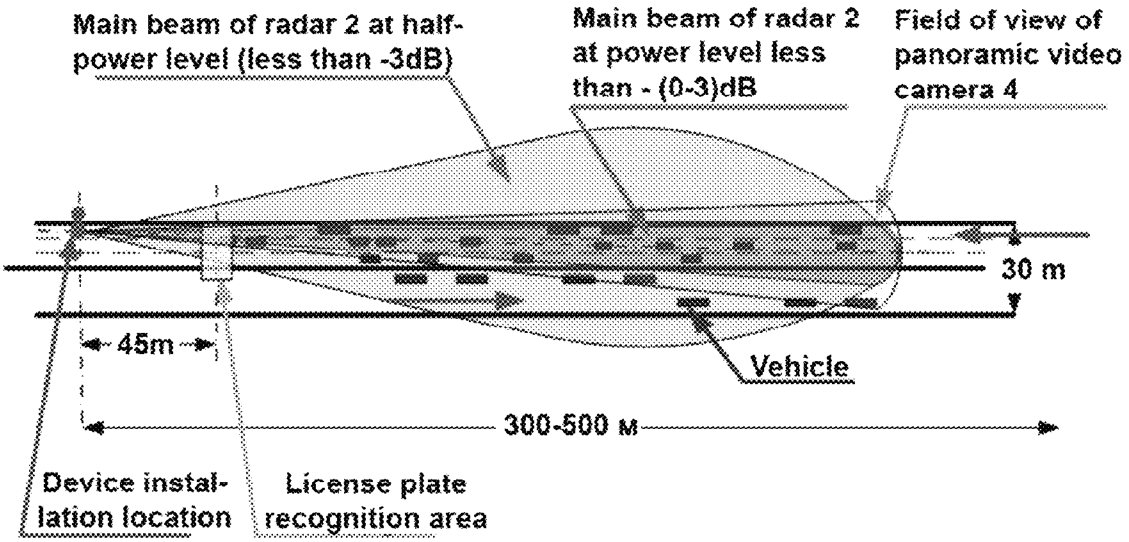
FIG. 4 is a diagram illustrating the operation of the device in the monitored road section.

Then, electromagnetic pulses are emitted in the direction of vehicles moving along the selected road section and pulses reflected from vehicles are received by radar 2 (see FIG. 4). Simultaneously with the radar operation, the same road section is captured by video camera 4. The coverage area of the main antenna lobe is structurally linked to the field of view of panoramic video camera 4 (see FIG. 4). Based on the pulses received by radar 2, the distances and speeds of all vehicles, which are at the moment within a selected section of the road, are calculated by module 3. Independently from the previous action and simultaneously with it, the coordinates and speeds of the same vehicles, which are displayed in the frame captured by video camera 4, are calculated by control and data processing module 1. Thereafter, the above data streams containing data on the speeds and coordinates of all vehicles within a selected section of the road and obtained independently of each other are compared using, for example, the correlation method in accordance with claim 2. The comparison is performed by module 1. Data received from radar 2 is considered to be the reliable metrological data on the speeds and coordinates $Y_i$ of vehicles. Data received from video camera 4 is taken to be the reliable metrological data on coordinates $X_i$ of vehicles. If the vehicles exceed the allowed speed limit, they are determined as speed violators and each of them is tracked by control and data processing module to a distance allowing recognition of their license plates by video camera 5. Then module 1 automatically recognizes the license plate and generates an image frame of the speed violator. The frame contains the easily readable license plate, date, time, video camera identifier and the recorded speed value, which allows automatic recording of traffic violations.

Thus, because the developed method uses reliable metrological data on the coordinates and speeds of vehicles monitored along all traffic lanes simultaneously, the probability of the erroneous identification of speed-violating vehicles by the automatic traffic violation recording system is much lower compared with the prototype method.

Figure 6A:
FIG. 6 is an example of a specific implementation of displaying the results of the device's operation on a monitor screen at the operational traffic control center.
Figure 6B:
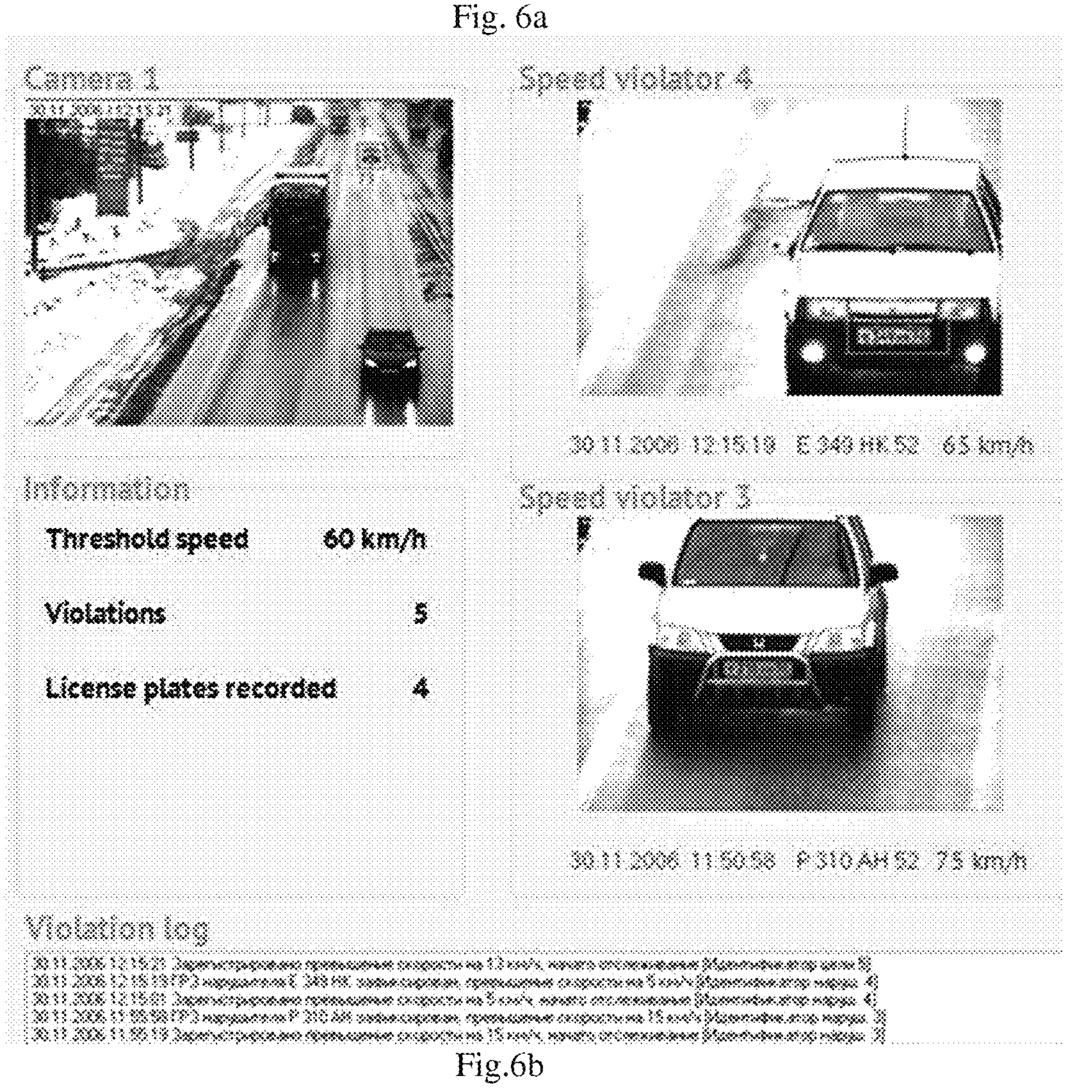

FIG. 6 shows how the results of the device operation are displayed at the operational traffic control center.

FIG. 6 (*a*) shows a snapshot acquired by the panoramic video camera displaying a speed-violating vehicle and its actual speed (73 km/h). The date and time of the traffic violation are shown in the top left corner of the snapshot.

FIG. 6 (*b*) shows a fragment of the event log stored in the data base on the recorded traffic violations. The threshold speed of 60 km/h is specified. All the vehicles whose speeds exceed the threshold speed are recorded as speed violators in the event log; the recognized license plate, speed of the vehicle, date and time of the violation are recorded.

A panoramic view of the monitored road section with a speed-violating vehicle is in the top right corner; the snapshots of the vehicle with the recognized license plate are displayed on the right.

These data are sent to the operational traffic control center where an administrative offence report is drawn up.

Thus, the proposed method and device for its implementation provide the following technical result:

reduced probability of the erroneous vehicle identification by the automatic traffic violation recording system, which is achieved through the use of two independent vehicle speed and coordinate measurement methods (using a video camera and a radar) with a subsequent comparison of the obtained measurements, which reduces the overall probability of erroneous vehicle identification.

extension of the speed control area from one or two dozens of meters to several hundreds of meters;

use of one rather than several devices to monitor multi-lane road sections.

This helps meet the set objectives.

What is claimed is:

1. A method for determining speeds and coordinates of vehicles comprising steps of:

emitting electromagnetic pulses in a direction of vehicles moving along a road section of a few hundred meters long and receiving electromagetic pulses reflected from the vehicles by means of a radar;

video recording said road section by means of a panoramic video camera synchronously with said emitting of electromagnetic pulses, capturing thereby a video image of said road section, wherein the panoramic video camera is calibrated such that distance coordinates for a corresponding road section are assigned to each row element $Y_i$ and to each column element $X_i$ of the video camera matrix;

calculating for each vehicle distance coordinates and a speed of the vehicle by comparing parameters of emitted and received electromagnetic pulses;

independently and simultaneously calculating distance coordinates and speeds for the same vehicles captured in the video image;

comparing data streams from the radar and panoramic video camera comprising the speed and distance coordinates for each vehicle, which is at the moment within said road section, wherein the data received from the radar are taken to be reliable metrological data on the speeds and distance coordinates $Y_i$ of the vehicles, and wherein the data received from the panoramic video camera are considered to be reliable metrological data on the speeds and distance coordinates $X_i$ of the same vehicles;

comparing for each vehicle the calculated vehicle speed with a maximum allowed speed in the road section, and, in case of a speed violation, generating subsequently a signal to recognize a license plate of a speed-violating vehicle by means of a license plate recognition video camera and monitoring each vehicle violating the speed limit; and generation by means of a license plate recognition video camera an image frame of the violating vehicle, which comprises a recognized license plate, date, time, recorded speed and video camera identifier, providing thereby automatic recording of traffic violations.

2. A method according to claim 1 wherein the data streams comprising the speeds and distance coordinates of all vehicles, which are at the moment within a selected road section, and obtained independently from the radar and the panoramic video camera are compared by a correlation method.

3. A device for determining vehicle speeds and distance coordinates comprising:

a radar adapted for emitting electromagnetic pulses in a direction of vehicles moving along a road section of a few hundred meters long and receiving electromagnetic pulses reflected from the vehicles;

a panoramic video camera adapted for capturing a video image of said road section synchronously with said radar emitting electromagnetic pulses, wherein the panoramic video camera is calibrated such that distance coordinates for a corresponding road section are assigned to each row element $Y_i$ and to each column element $X_i$ of the video camera matrix;

at least one license plate recognition video camera for recording and recognizing license plates of speed-violating vehicles, and a control and data processing module connected to the radar and the panoramic video camera, wherein the radar comprises a signal processing module capable of calculating speeds and distance coordinates of all the vehicles within said road section based on data received from the radar and based on data received from the panoramic video camera;

wherein the control and data processing module is equipped with software to synchronize the radar and the panoramic video camera, compare data streams from the radar and the panoramic video camera, obtain reliable metrological data on the speeds and distance coordinates of speed violators, identify a speed violator and transmit data for automatic recording of traffic rule violations, and wherein the data received from the radar are taken to be reliable metrological data on the speeds and distance coordinates of $Y_i$of the vehicles, and wherein the data received from the panoramic video camera are considered to be reliable metrological data on the speeds and distance coordinates $X_i$ of the same vehicles.

4. The device according to claim 3 wherein functions of the panoramic video camera and functions of the license plate recognition video camera are performed by one wide-angle megapixel video camera.

5. The device according to claim 3 wherein several standard video cameras are used as the license plate recognition video camera, depending on a number of traffic lanes.

* * * * *